US009767409B1

United States Patent
Makhijani et al.

(10) Patent No.: US 9,767,409 B1
(45) Date of Patent: Sep. 19, 2017

(54) LATENT FEATURE BASED TAG ROUTING

(71) Applicant: Amazon Technologies, Inc., Seattle, WA (US)

(72) Inventors: Roshan Harish Makhijani, Boston, MA (US); Benjamin Thomas Cohen, Seattle, WA (US); Grant Michael Emery, Seattle, WA (US); Madhu Madhava Kurup, Bellevue, WA (US); Vijai Mohan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 14/673,407

(22) Filed: Mar. 30, 2015

(51) Int. Cl.
| G06E 1/00 | (2006.01) |
| G06E 3/00 | (2006.01) |
| G06F 15/18 | (2006.01) |
| G06G 7/00 | (2006.01) |
| G06N 3/08 | (2006.01) |
| G06F 17/30 | (2006.01) |

(52) U.S. Cl.
CPC .......... *G06N 3/08* (2013.01); *G06F 17/3082* (2013.01)

(58) Field of Classification Search
USPC .......................................................... 706/20
See application file for complete search history.

(56) References Cited

U.S. PATENT DOCUMENTS

| 7,814,107 | B1 * | 10/2010 | Thirumalai | ....... | G06F 17/30011 |
| | | | | | 707/749 |
| 7,904,462 | B1 * | 3/2011 | Thirumalai | ............ | G06Q 30/06 |
| | | | | | 707/749 |
| 7,908,279 | B1 * | 3/2011 | Thirumalai | ......... | G06F 17/2211 |
| | | | | | 704/10 |
| 7,970,773 | B1 * | 6/2011 | Thirumalai | ......... | G06F 17/2211 |
| | | | | | 707/749 |
| 8,046,372 | B1 * | 10/2011 | Thirumalai | ....... | G06F 17/30616 |
| | | | | | 707/749 |
| 8,112,376 | B2 * | 2/2012 | Raichelgauz | ........ | H04H 20/103 |
| | | | | | 706/46 |
| 8,873,813 | B2 * | 10/2014 | Tadayon | .................. | G06K 9/00 |
| | | | | | 382/118 |

(Continued)

OTHER PUBLICATIONS

Analysis of EEG Signals and Facial Expressions for Continuous Emotion Detection Mohammad Soleymani; Sadjad Asghari-Esfeden; Yun Fu; Maja Pantic IEEE Transactions on Affective Computing Year: 2016, vol. 7, Issue: 1 pp. 17-28, DOI: 10.1109/TAFFC.2015.2436926 IEEE Journals & Magazines.*

(Continued)

*Primary Examiner* — Michael B Holmes
(74) *Attorney, Agent, or Firm* — Knobbe Martens Olson & Bear LLP

(57) ABSTRACT

Features are disclosed for identifying and routing items for tagging using a latent feature model, such as a recurrent neural network language model (RNNLM). The model may be trained to identify latent features for catalog items such as movies, books, food items, beverages, and the like. Based on similarities in latent features, tags previous assigned to items may be applied to untagged items. Application may be manual or automatic. In either case, resources need to be balances to ensure efficient tagging of items. The included features help to identify and direct these limited tagging resources.

20 Claims, 7 Drawing Sheets

(56) References Cited

U.S. PATENT DOCUMENTS

| | | | |
|---|---|---|---|
| 8,959,037 B2* | 2/2015 | Raichelgauz | H04H 20/103 |
| | | | 706/10 |
| 9,195,714 B1* | 11/2015 | Thirumalai | G06F 17/3071 |
| 9,449,241 B2* | 9/2016 | Hager | B25J 9/1697 |
| 9,569,696 B1* | 2/2017 | Osindero | G06K 9/66 |
| 9,615,136 B1* | 4/2017 | Emery | H04N 21/47202 |
| 9,652,682 B2* | 5/2017 | Hager | G06K 9/3241 |
| 2014/0244631 A1 | 8/2014 | Arthur et al. | |

OTHER PUBLICATIONS

Web page recommendations using Radial Basis Neural Network technique C N Pushpa; Ashvini Patil; J. Thriveni; K R Venugopal; L M Patnaik 2013 IEEE 8th International Conference on Industrial and Information Systems Year: 2013 pp. 501-506, DOI: 10.1109/ICIInfS.2013.6732035 IEEE Conference Publications.*

Component analysis of a Sentiment Analysis framework on different corpora Walaa Medhat; Ahmed H. Yousef; Hoda K. Mohamed 2014 9th International Conference on Computer Engineering & Systems (ICCES) Year: 2014 pp. 300-306, DOI: 10.1109/ICCES.2014.7030976 IEEE Conference Publications.*

Iyyer et al. "Political Ideology Detection Using Recursive Neural Networks." Proceedings of the 52$^{nd}$ Annual Meeting of the Association for Computational Linguistics. pp. 1113-1122, Baltimore, Maryland, USA, Jun. 23-25, 2014.

Mikolov et al. "Distributed Representations of Words and Phrases and their Compositionality." pp. 1-9. Oct. 16, 2013.

Recurrent neural network. From Wikipedia, the free encyclopedia. Jan. 14, 2015. http:/en/Wikipedia.org/w/index.php?title=Recurrent_neural_network&printable=yes. pp. 1-8.

* cited by examiner

LATENT FEATURE BASED TAG ROUTING

CROSS-REFERENCE TO RELATED APPLICATIONS

This application is related to U.S. application Ser. No. 14/673,374 filed on Mar. 30, 2015, entitled "LATENT FEATURE BASED RECOMMENDATIONS", which is hereby expressly incorporated by reference in its entirety. This application is also related to U.S. application Ser. No. 14/673,384 filed on Mar. 30, 2015, entitled "RANDOMIZED LATENT FEATURE LEARNING", which is hereby expressly incorporated by reference in its entirety.

BACKGROUND

Computers and their capacity to process and store vast amounts of data present many interesting problems in efficient management of information. Data collections including millions of items can be stored. Such a catalog is useful in some implementations when it can be efficiently searched for items of interest.

One way to provide efficient searching of such large data collections is through the use of metadata. Metadata generally refers to information about one or more particular items included in the data collection. In some literature, metadata may be referred to as a tag. The process of applying metadata to an item may be referred to as tagging. The tagging process can be manual (e.g., user selected tags inputted for association with an item) or automated (e.g., computer generated tags).

Given the volume of items that may be included in a given data collection, a need exists to efficiently and accurately identify not only tags, but a routing plan to apply accurate tags for the items.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
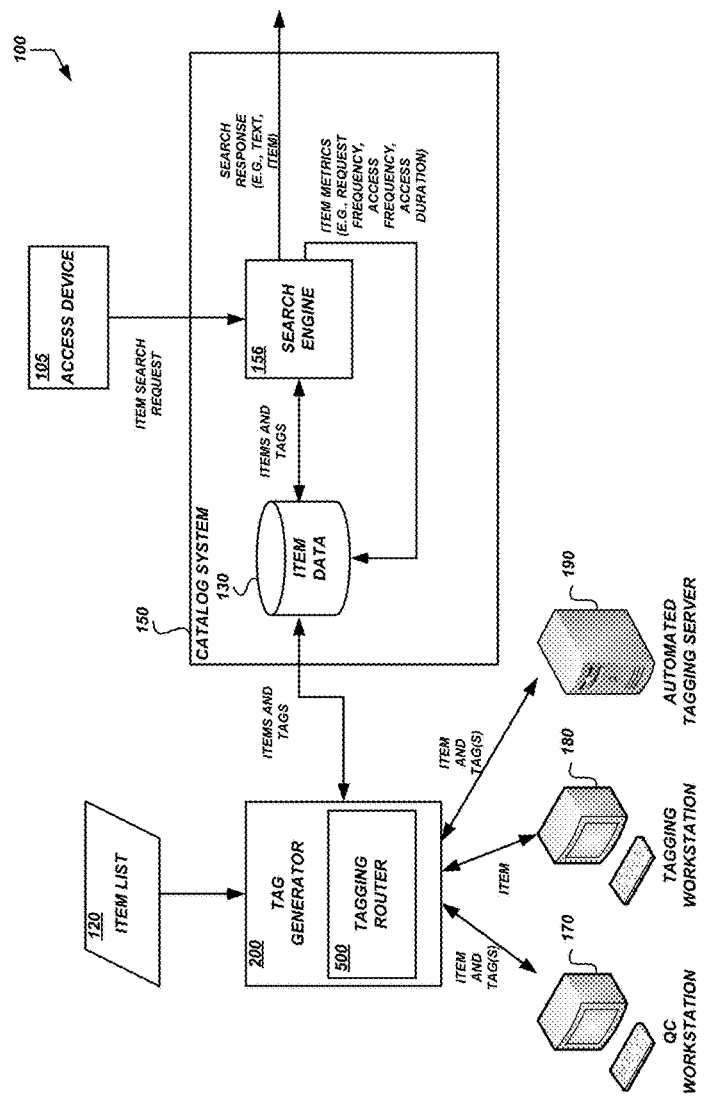
FIG. 1 is a network diagram of an example of a system incorporating latent feature tag routing.

The resources used for tagging may be limited. Examples of the resources used during manual tagging include time, workstation availability, memory, power, and processing cycles. Similar constraints are placed on automated tagging which is also subject to limited time, server speed, server space, bandwidth, power, and the like. Given unlimited resources, each item would undergo extensive manual tagging by an expertly trained individual. However, when faced with millions of items, such detailed tagging is unrealistic.

At the other end of the spectrum, all items may be automatically tagged without incurring any of the expense of manual tagging. While this may provide tag information for each item in the data collection, automated tagging typically relies on some form of machine learning to identify tags to apply. A neural network model is one example of a machine learning feature which may be used to obtain tag predictions. In instances where an unknown item resembles a known item, the tags can be predicted with a high degree of accuracy. However, when an unknown item, such as a brand new product or item type, is presented for automated tagging, an inaccurate or irrelevant tag may be applied. This incorrect tag information contravenes one of the motivators for tagging in that tags should help identify items in the catalog, not make it harder to identify items.

In either manual or automatic tagging, explicit features of a previously tag item may be compared to explicit features of an untagged item to determine whether items are related and thus can be tagged similarly. Explicit features generally refer to objective information about an item such as size, color, manufacturer, title, artist name, or the like. Explicit features typically are static in nature changing infrequently.

The features described in further detail below include a model, such as a recurrent neural network language model (RNNLM), trained to identify latent features for items. Latent features, as compared to explicit features, generally refer to subjective contextual information about an item such as access history, (e.g., purchase, view, read, listen, play, download, preview, etc.), history of providing feedback for an item (e.g., rating, comment, recommendation), listing history (e.g., adding to wish list, watch list, posting or linking to/via a third-party service such as social media, blog, email), or other behavioral data for items. Because latent features are behavior based, latent features may change over time. A history generally refers to a collection of elements (e.g., accesses, feedback, and listing). The history may include information indicating an order for the collection of elements. In one implementation, the order will be chronological. In some implementations, history will be organized such as in chronological order where the first element is the most recent element and the last element is the oldest element. In some implementations, elements may include chronological information. One or more element may include an indication of quantity such as amount of movie accessed, duration of access, frequency of access, length of review, number of listings by a user for the element, and the like.

An example of an explicit feature may be the title of a movie such as "Ishtar." A latent feature of the movie is that "Ishtar" tends to be accessed in close temporal proximity to "Elf." In this example, based on the latent features, it may be determined that "Ishtar" aligns well with existing moods, themes, and genres of "Elf." As such, one or more of the tags which may be applied to "Elf" may be applicable to "Ishtar." Alternatively, or in addition, tags identified for "Ishtar" may be applicable to "Elf." Still further, there may be a yet to be identified tag which can express the latent relationship between these two movies.

The model thus identifies similar latent features for items that are accessed in similar contexts. These features are then used to group and classify similar items. Once grouped, some items may be tagged with some classifications and some may have no tags. Tags can be applied to the untagged items using the classification with those particular moods, themes and/or genres.

Similarity can be a relative measure for items because a first item's similarity to a second item may be different than the first item's similarity to a third item. As such, the degree of similarity may be a used to further identify related items. Using the strength of similarity, a confidence metric may be generated to provide a relative measure as to how closely two items are related. This confidence metric can indicate a degree of certainty that a tag for one item is applicable to another. In some implementations, the confidence metric may be referred to as a confidence score.

The confidence metric can be used to selectively route an item through a tagging system. For example, if a tag is discovered for an item which is associated with a high degree of confidence, the tag may be applied through an automated tagging system. However, if the tag is of questionable confidence, the tag may be routed to a quality control system where manual or automated review of the proposed tag can be performed. If the tag is of low or no confidence, the item may be routed to a manual tagging system.

One non-limiting advantage of the described features is that items can be prioritized for tagging, based at least in part on the groupings. Furthermore, a set of recommended tags for those items can be provided as a starting point for manual tagging and thus classify the item accurately.

Features are described in further detail for identifying and routing items for tagging using a latent feature model, such as a recurrent neural network language model (RNNLM). The model may be trained to identify latent features for catalog items such as movies, books, food items, beverages, and the like. Based on similarities in latent features, tags previous assigned to items may be applied to untagged items. The latent features may be expressed through the model as latent feature vectors where a latent feature vector may include values for multiple features (e.g., catalog items) that represent an output (e.g., a tag). Application may be manual or automatic. In either case, resources need to be balances to ensure efficient tagging of items. The included features help to identify and direct these limited tagging resources.

Although the examples and implementations described herein focus, for the purpose of illustration, on using latent features for tag based routing, one skilled in the art will appreciate that the techniques described herein may be applied to other processes, methods, or systems. For example, the techniques may be used with other types of cataloging systems which include automatic and manual inputs to generate a suggestions of related items, search engine optimizations (e.g., catalog indexing), data storage organization systems (e.g., colocation of related or commonly accessed items), or the like. Various aspects of the disclosure will now be described with regard to certain examples and embodiments, which are intended to illustrate but not limit the disclosure.

FIG. 1 is a network diagram of an example of a system incorporating latent feature tag routing. As shown, an access device 105 transmits an item search request to a catalog system 150. The access device 105 may be an electronic communication device configured to transmit machine readable messages to the catalog system 150. Examples of the access device 105 include a smartphone, a tablet computer, a desktop computer, a laptop computer, a set-top-box, a streaming media device, a feature phone, and a television. The messages may be formatted according to a standardized protocol such as TCP/IP, HTTP, FTP, or the like. The transmission may be wired or wireless means.

The item search request may include text input such as a search query term. The item search request may include audio data representing an utterance from a user. A search engine 156 included in the catalog system 150 receives the item search request. The search engine 156 is configured to search for items included in an item data storage 130 using the item search request information. For example, if the item search request includes audio data, the search engine 156 may be configured to obtain a transcription of the audio from an automatic speech recognition system. Using the transcription or, in the case where the search query term is provided in textual form in the item search request, the search engine 156 identifies items in the item data storage 130. The identification may be a literal identification (e.g., exact match between item data and the item search request). The identification may be a partial match (e.g., words with similar stems or synonyms matching). In some implementations, the search may be executed against an index of the item data storage 130.

As items are identified, the information about the items may also be retrieved from the item data store 130. The information about an item may include one or more tags for the item. The information about the items identified may be provided by the search engine 156 as a search response. The search response, in some implementations, may be transmitted back to the access device 105. In some implementations, the search response may be forwarded to another system. For example, if the item search request included an action in conjunction with the search (e.g., "play movie Ishtar"), if the movie was found, playback may be initiated as part of the search response from the search engine 156 by transmitting a message to a movie playing device. Accordingly items can be searched and accessed from the catalog. Accessing an item from the catalog, depending on the item's nature, may include playback, display, placing an order, delivery, download, printing, or otherwise providing at least a portion of an item.

The search engine 156 may be further configured to track metrics about item search requests and item accesses. For example, the frequency with which an item is access or the duration (e.g., how long) an item is accessed may be tracked. The tracking may be performed on a per device, per user, per account, per location (e.g., geographic location or area), per time period (e.g., time of day, day of week, month, or combination thereof), or other aggregation. The collected metrics can be used to identify the latent features of items as described in further detail below. The tracked metric information may be stored in the item data storage 130 or other memory device.

Items may be identified for tagging. The items may be identified from existing items in the item data storage 130, such as items which are frequently accessed but have no, or a limited number, of tags. The items may be new items which will be added to the catalog system 150. An item list 120 may be provided to a tag generator to identify tags for the items included on the item list 120. The tag generator 150 shown in FIG. 1 includes a tagging router 500. The tagging router 500 is configured to identify an efficient route for tagging each item included in the item list 120. Possible routes include a tagging quality control (QC) workstation 170, a tagging workstation 180, or an automated tagging server 190. The details of the routing and the tagging router are discussed in further detail below such as with reference to FIGS. 3, 4, and 5.

As shown in FIG. 1, the tag generator 200 is in data communication with the catalog system 130 via the item data storage 130. As tags are identified for an item, the tag generator 200 may be configured to transmit the items and tags to the catalog system 130 for inclusion in the item data storage 130. It will be understood that the data communication link between the catalog system 130 and the tag generator 200 may be direct or include one or more intermediate servers which are omitted in FIG. 1.

Figure 2:
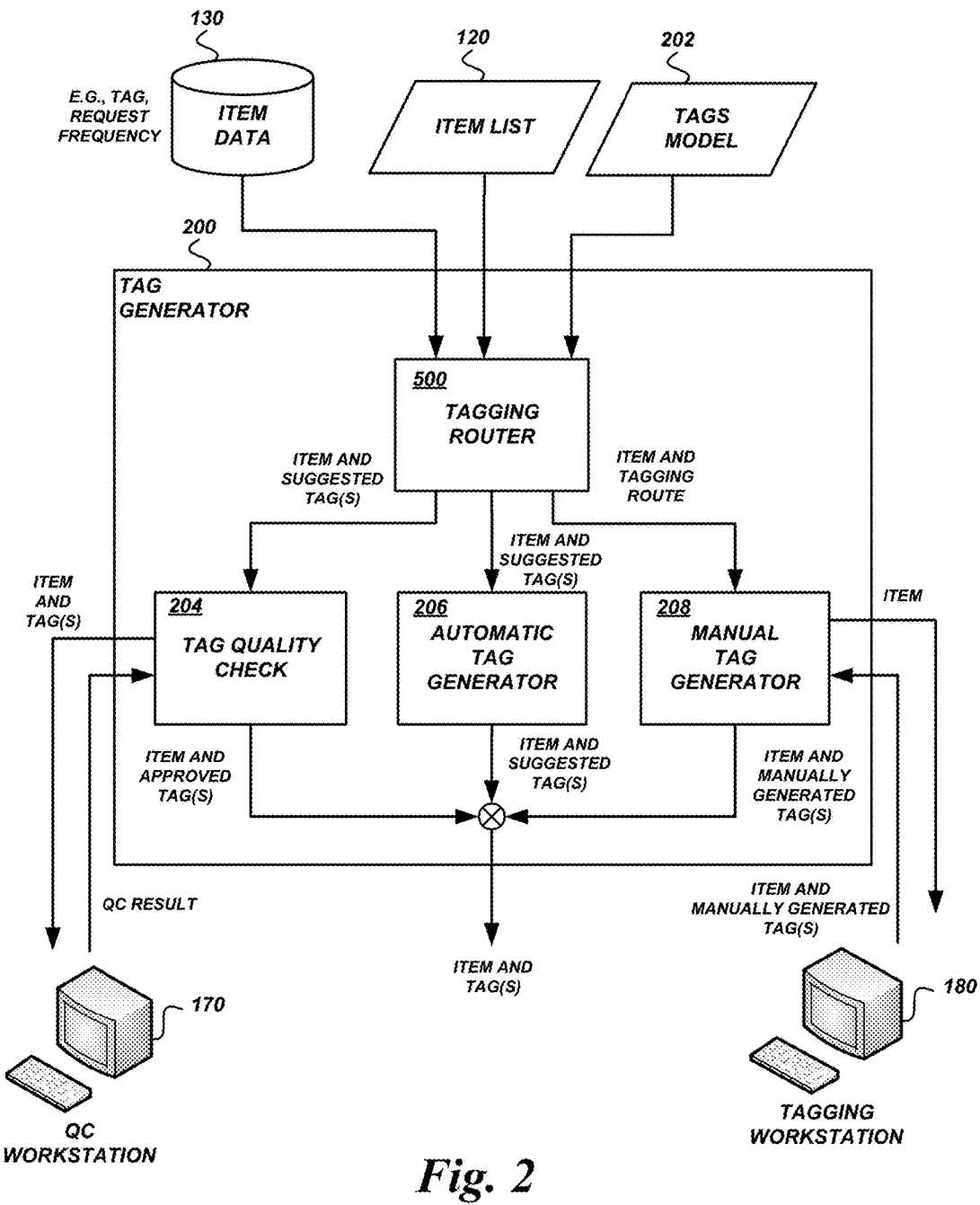
FIG. 2 is a functional block diagram of an example of a tag generator.

FIG. 2 is a functional block diagram of an example of a tag generator. The tag generator 200 may be configured to selectively route items included in the item list 120 to a tagging destination. The routing decision may be performed using item data obtained in from the item data store 120. The routing decision may additionally or alternatively use a tags model 202. The tags model 202 may be a recurrent neural network language model or other model configured to receive input values and provide a predicted output. The recurrent neural network language model may be provided by a modeling device, such as a recurrent neural network language modeling device configured to receive training data and provide a model in response. The collection of training data received may be referred to as the training data set. For example, the tags model 202 may be trained using access histories for multiple accounts. The access histories may be represented using unique item identifiers such as a universal product code, a standard identification number, barcode, unique arrangement of graphic symbols, or other alphanumeric identification strings, and presented in sequential order of access. In some implementations, the identifier may be a nonword. A nonword is a sequence of letters, numbers, symbols or a combination thereof which collectively have no meaning or definition in a spoken or written language used by humans for communication for identifying an object. For example, "apple" is a word having a meaning (e.g., red fruit that grows on a tree) while "QJC2D18X03" is a nonword including an arbitrary collection of letters and numbers which are not found in a dictionary or are otherwise associated with an accepted meaning or definition. QR codes or barcodes may include letters, numbers, and/or symbols. Such graphic codes may encode nonwords. For example, a QR code may be scanned to generate an image of the QR code. The image may then be processed to extract information from or referenced by the QR code. In some implementations, the information may be an item identifier including a nonword.

The training of the tags model 202 may include skip-gram modeling or bag-of-word modeling of the access histories. One commercially available implementation for generating the tags model 202 is the word2vec open source project hosted by Google, Inc. For a given item input value the model may provide one or more related tags. The model may further provide a metric indicating a degree of relatedness between the input item and the outputted predicted tags. While word2vec may be used in describing some features, other item modeling tools may be used to generate the tags model 202. Any tool capable or configure to provide models which provide features based on a multidimensional degree of similarities (e.g., between items and location within a list). Such models identify clusters of items related over a single variable such as a target tag. A tool which provides the tags model 202 that accepts item identifiers and provides one or more recommended tag may be implemented in conjunction with or as an alternative to word2vec.

The tagging router 500 receives the inputs and routes the item and tags (if available) to one of a tag quality check 204, an automatic tag generator 206, or a manual tag generator 208. The tagging router 500 will be discussed in further detail below such as with reference to FIGS. 3, 4, and 5.

The tag quality check 204 may be selected if a tag is identified for an item included in the item list 120 but at a confidence level which indicates some doubt about the accuracy of the selected tag. The confidence level may be based on a degree of relatedness between the item from the item list and an identified related tag. The confidence level may be based on access information for the identified tag, such as quantity or frequency of items accessed with the tag. For example, if an item associated with the tag is popular (e.g., frequently accessed, viewed, downloaded, etc.), the likelihood any metadata provided for the tag is accurate is high. Conversely, if an item is new or is not frequently accessed, less review of the metadata will have been performed for the item and tag. This may indicate a lower level of confidence in the accuracy of the metadata as compared to another item with, for example, a higher access frequency.

The tag quality check 204 receives the item and suggested tags. The items and tags received by the tag quality check 204 may be transmitted to the quality control workstation 170. The quality control workstation 170 may be configured to present the item and the suggested tags. The quality control workstation 170 may receive inputs approving a suggested tag, denying a suggested tag, or introducing new tags for the item. For example, using one or more input devices such as a mouse, keyboard, stylus, touchscreen, etc. a tagging operator may provide tags for the item. The collection of inputs may be provided as a quality control result to the tag quality check 204. The item and any approved tags are transmitted as an output of the tag quality check 204. In some implementations, the item and any approved tags may be transmitted to the automatic tag generator 206 to apply the approved tags automatically to the item. In some implementations, the quality control process may be centralized at a tagging quality control system which then distributes items and tags to the quality control workstation 170 such as via a workflow process.

The automatic tag generator 206 may be selected when a tag is identified for an item included in the item list 120 at a confidence level which indicates a degree of certainty about the accuracy of the tag. The confidence level may be similar to the confidence level discussed with reference to the tag quality check. The automatic tag generator 206 may transmit the tags and item. The transmission may be to the item data store 130. In such instances, the item metadata is added reflect the identified tags. If the item previously existed in the item data store 130, the metadata may be augmented to include the identified tags along with any previously identified tags. In some implementations, the transmission may be an update command executable by the item data store 130.

The manual tag generator 208 may be selected when no tags or tags of such low confidence are identified for an item included in the item list 120. In such instances, the item may be routed to the tagging workstation 180. The tagging workstation 180 may be configured to present the item needing tag information. The tagging workstation 180 may receive inputs introducing new tags for the item. In some implementations, the tagging workstation 180 may include a tag selector configured to provide a list of all existing tags included in the item data storage 130. For example, using one or more input devices such as a mouse, keyboard, stylus, touchscreen, etc. a tagging operator may provide tags for the item. The tagging workstation 180 may be limited to selecting from the existing tag list. In some implementations, the input may be a new tag. The item and manually identified tags may be returned to the manual tag generator 208. The item and any identified tags are transmitted as an output of the tag generator 208. In some implementations, the item and any identified tags may be transmitted to the automatic tag generator 206 to apply the approved tags automatically to the item. In some implementations, the item and any identified tags may be transmitted to the tag quality check 204 to review the manually applied tags.

Figure 3:
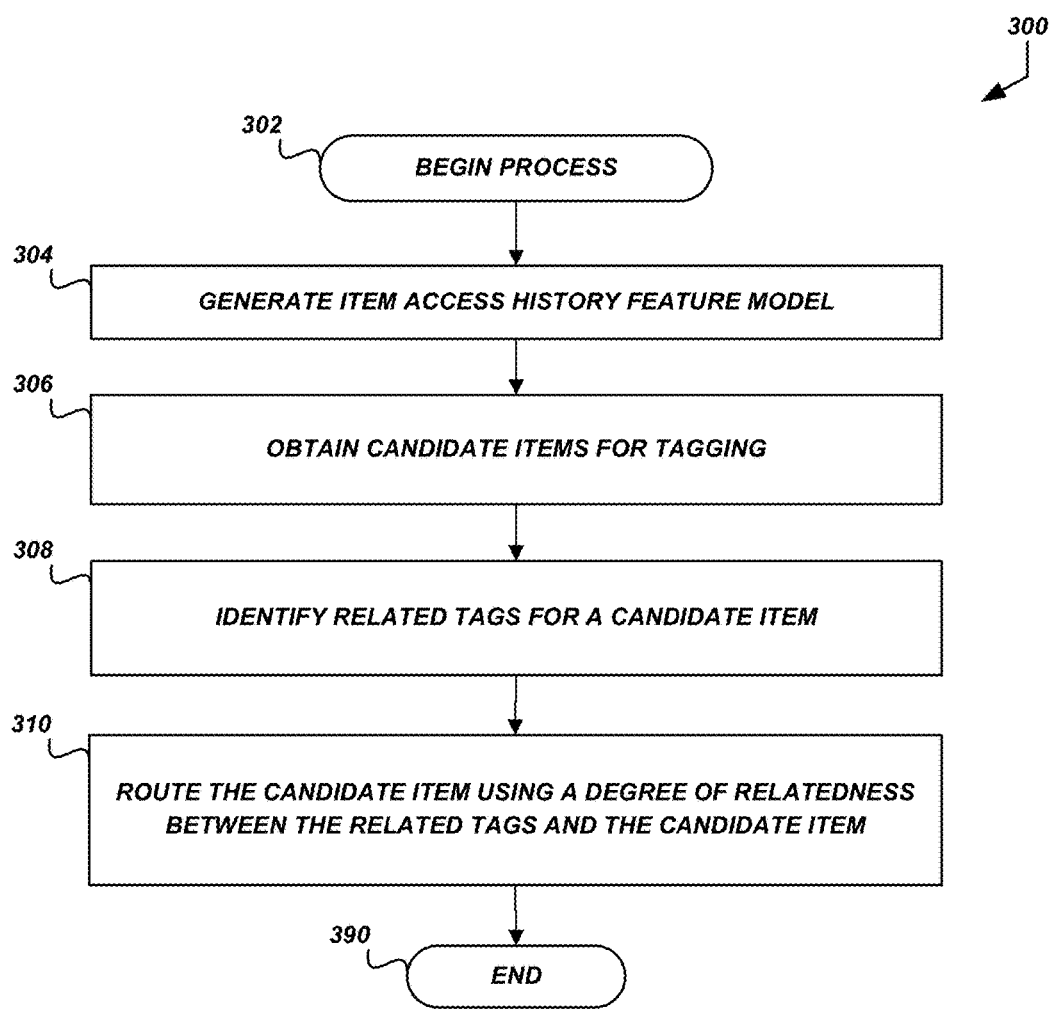
FIG. 3 is a process flow diagram of an example method of latent feature tag routing.

FIG. 3 is a process flow diagram of an example method of latent feature tag routing. The process 300 shown in FIG. 3 may be implemented in whole or in part by the tag generator 200 shown in FIG. 1 or 2.

The process 300 begins at block 302. At block 304, an item access history feature model is generated. The feature model may provide an indication of the latent features which relate a first item to a second item. As shown in FIG. 3, the latent features are identified using item access histories. A corpus of item access histories may be compiled and provided as training data for the model. The item access histories may be provided as a list of item identifiers. In such implementations, the item identifiers may be considered the "words" of the text corpus and the resulting model provides a representation of a vocabulary based on the words. Thus, for a given vocabulary entry, an item may be identified.

At block 306, candidate items are obtained for tagging. The candidate items may be included in the item list 120. The candidate items may be obtained as new items which are to be added to the catalog system 150. Because the latent features may be used to generate tags may change over time, it may be desirable to subject a subset of items to the tagging process periodically. For example, each item may be associated with a last tagged date identifying the time and/or date the item was last subjected to the tagging process. In such implementations, the item data store 130 may be queried to obtain a set of items which need re-tagging. Other item metadata or item metrics may be considered to identify existing items for tagging. For example, the frequency with which an item is accessed, searched, or otherwise provided by the system may be used to identify items for tagging. If an item is frequently accessed but has no or few (e.g., less than minimum threshold number) tags, it may be a candidate for tagging.

At block 308, related tags for a candidate item are identified. The related tags may be identified using the item access history feature model obtained at block 304. The identification may include providing the identifier of the candidate item as the input and receiving one or more related tags. As discussed above, the related tags may be provided along with a value identifying a degree of relatedness to the candidate item.

At block 310, the candidate tag is routed using a degree of relatedness between the related tags and the candidate item.

Figure 4A:
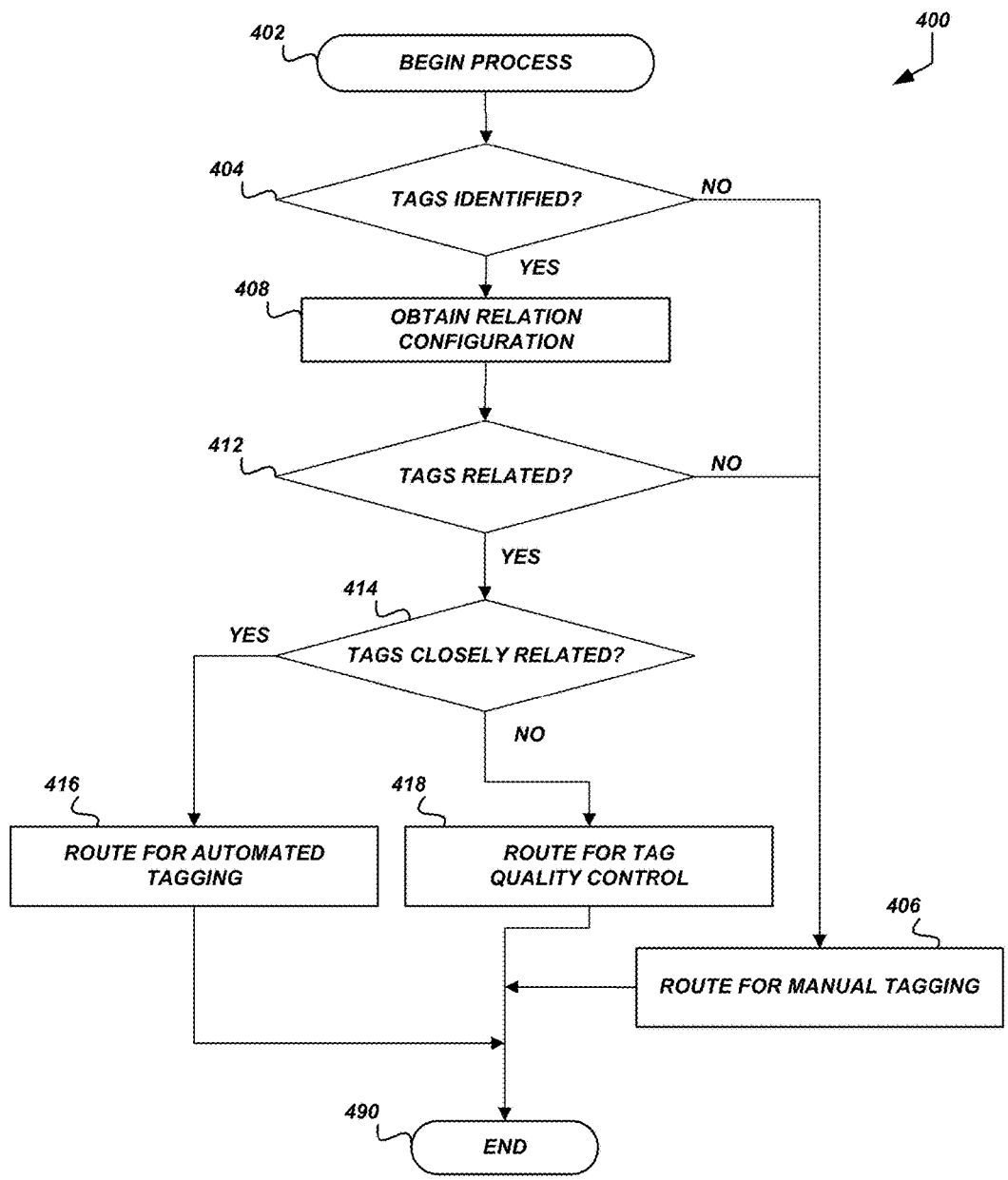
FIG. 4A is a process flow diagram of an example method of routing a candidate item which may be included in latent feature tag routing implementations.

FIG. 4A is a process flow diagram of an example method of routing a candidate item which may be included in latent feature tag routing implementations. The process 400 shown in FIG. 4A may be implemented in whole or in part by the tag generator 200 shown in FIG. 1 or 2 or the tagging router 500 shown in FIG. 1, 2, or 5.

The process 400 begins at block 402. The process 400 assumes that a set of related tags has been identified for a candidate item to be routed. At block 404 a determination is made as to whether related tags have been identified. The determination may be based on whether the number of tags in the related tag set is greater than zero. That is, whether the set of related tags includes any tags. In some implementations, the determination may be based on a minimum number of related tags in the set. For example, a threshold number of tags may be compared to the number of tags identified in the set. If no (or not enough) related tags for the candidate item have been identified, the process 400 proceeds to block 406. At block 406, the candidate item is routed for manual tagging. Routing the candidate item for manual tagging may include transmitting the item identifier for the candidate item to the tagging workstation 180. The item identifier may be included in a standardized format such as an XML formatted document, or as a parameter of a REST-ful web-service.

Returning to decision block 404, if the set of related tags includes at least one tag, the process 400 continues to block 408. At block 408, a relation configuration is obtained. The relation configuration includes information identifying how a tag and a candidate item may be analyzed to generate the degree of relatedness. For example, the tagging router 500 may be used to tag various types of items such as books, movies, food items, wines, beers, personal products (e.g., shampoo, conditioner), household goods (e.g., paper towels, napkins, cleaners), or the like. How the tagging router 500 assesses "relatedness" for a first type of items to a tag may be different from a second type of items. Table 1 provides one example of relation configuration for several item types.

TABLE 1

| Item Type | Minimum Relatedness (rel_min) | Relatedness for Autotag (rel_auto) |
|---|---|---|
| Book | 0.5000000 | 0.8023894 |
| Movie | 0.5000000 | 0.6239845 |
| Beer | 0.3000000 | 0.5204861 |

As shown in Table 1, the minimum relatedness value for a given item type indicates a minimum degree of relatedness between the candidate item and an tag in the set of related items which is needed for the identified related tag to be considered "related" for catalog purposes. As shown, books and movies are associated with a similar minimum, while the threshold for beer is lower. Such a configuration allows the same hardware configuration to dynamically perform tagging on various types of items via a configuration update.

Table 1 also includes relatedness for autotag values. These values identify a degree of relatedness between the candidate item and a tag in the set of related tags which is needed for the identified related tag to be considered closely related enough such that tags can be automatically applied to the candidate item.

At block 412, a determination is made as to whether tags in the set of tags exist which are related to the candidate item. The relation may be a minimum relatedness to the candidate item. This initial determination at block 412 is an initial filter to determine that tags in the set have a minimal level of relation to the candidate item. If the determination is negative, the process 400 proceeds to block 406 for routing to manual tagging. In some implementations, the identified tags may be routed with the candidate item and provided as suggestions for manual tagging. If the determination at block 412 is affirmative, the process 400 proceeds to block 414.

At block 414 a determination is made as to whether tags in the set of related tags are closely related to the candidate item. A close relation may be based on whether the relation value for a tag in the set meets or exceeds the relatedness for autotagging value. If the determination is negative, the tags included in the set of related tags which meet or exceed the relatedness for autotagging may be nominated for application to the candidate item. These tags may be provided at block 418 for review via tag quality control. In such cases, one or more of the candidate item, the tags, or identifiers of the related tags may be provided to the quality control system, such as the quality control workstation 170.

Returning to block 414, if the determination is made that tags exist in the set of related tags which qualify for autotagging, at block 416, one or more of: the candidate item, the related tags, or the identifiers of the related tags may be provided for automated tagging, such as to the automated tagging server 190 (FIG. 1) or the automatic tag generator 206 (FIG. 2).

As described in FIG. 4A, the process 400 relies on relatedness as the only factor for arriving at a routing decision. In some implementations, a relatedness metric may be generated using the relatedness in combination with confidence in the predicted relationship.

Figure 4B:
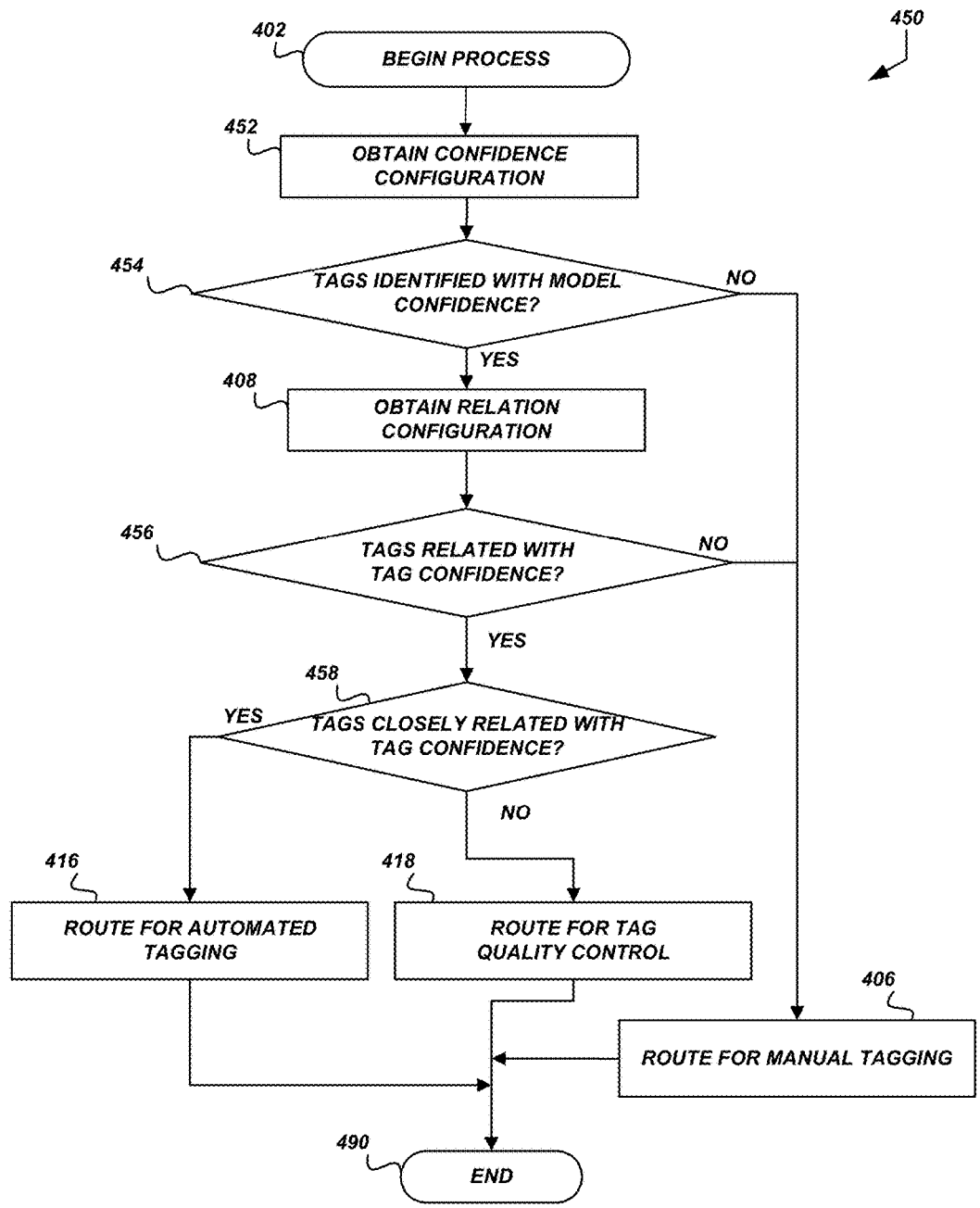
FIG. 4B is a process flow diagram of another example method of routing a candidate item which may be included in latent feature tag routing implementations and includes confidence.

FIG. 4B is a process flow diagram of another example method of routing a candidate item which may be included in latent feature tag routing implementations and includes confidence. The process 450 shown in FIG. 4B may be implemented in whole or in part by the tag generator 200 shown in FIG. 1 or 2 or the tagging router 500 shown in FIG. 1, 2, or 5.

The process 450 is similar to that the process 400 shown in FIG. 4A. However, the process 450 illustrates how confidence may be included in the routing decision.

The process 450 begins at block 402. The process 450 assumes a set of related tags has been identified for a candidate item to be routed. At block 452, a confidence configuration is obtained. Obtaining a confidence configuration may include loading a predetermined set of configuration values from a data source such as a database, file, network location, memory location or other information storage medium and/or device. The confidence configuration indicates how to generate a confidence level for predictions. As with the relatedness configuration, the confidence configuration may include different methods based on item type. For example, it may be sufficient to determine confidence for movies using the number of searches, while the confidence for beer or beef jerky might be determined using the number of purchases. Latent features, explicit features, or some combination thereof may be used to generate the confidence.

In addition to identifying the factors used to generate the confidence, how the factors are combined may also be specified via the confidence configuration. In one implementation, the configuration may include a formula for combining the factors. Such a configuration allows different factors and combinations of factors to be used for generating confidence values. For example, a number of searches over time may be used for item types "movies" and "books." However, for movies, the number of searches might not be weighted as heavily as the number of searches when assessing confidence for movies. Table 2 shows some example factors which may be included in a confidence configuration for various item types.

TABLE 2

| Item Type | Confidence Factor(s) | Variable Name(s) | Confidence Formula |
|---|---|---|---|
| Book | Searches for item | $s_i$ <br> b | $(s_i/b) + 2.354$ |

TABLE 2-continued

| Item Type | Confidence Factor(s) | Variable Name(s) | Confidence Formula |
|---|---|---|---|
| Movie | Number of books in catalog <br> Searches for item <br> Number of movies in catalog | $s_i$ <br> m | $s_i/(m/4)$ |
| Beer | Purchases of item <br> Number of repeat purchases of item | $p_i$ <br> $r_i$ | $\log(p_i * r_i)$ |

The confidence configuration may be specified for item models as well. For example, to determine the confidence in a model, the number of search histories used to generate the model may be one factor. In some implementations, the confidence information for the model may be provided with the model rather than being dynamically generated.

The confidence configuration may also include thresholds indicating levels of confidence needed for routing. Table 3 includes model and item confidence levels for various item types.

TABLE 3

| Item Type | Minimum Model Confidence (min_model_conf) | Minimum Tag Confidence (min_tag_conf) | Autotag Tag Confidence (auto_tag_conf) |
|---|---|---|---|
| Book | 2.04923 | 10.09234 | 22.23084 |
| Movie | 5.23089 | 3.20238 | 10.48078 |
| Beer | 1.11134 | 5.22305 | 6.234982 |

At block 454, a determination is made which is similar to the determination made at block 404 of FIG. 4A. However, the determination at block 454 also includes a confidence component. At block 454, a determination is made as to whether number of tags in the related tag set is greater than zero. That is, whether the set of related tags includes any tags. In some implementations, the number of items in the set may be compared to a threshold value other than zero. The determination at block 454 also considers the confidence in the model which identified the related tags. One expression of the determination is shown in Equation 1 below.

$$(\text{rel\_tags} > \text{min\_tag\_count}) \&\& (\text{model\_conf} > \text{min\_model\_conf}) \quad \text{Eq.(1)}$$

where:
rel_tags is the number of tags in the related tags set,
min_tag_count is the minimum number of tags in the related tags set,
model_conf is the confidence in the model used to generated the relations, and
min_model_conf is the minimum threshold confidence for the process.

In one example, if a model identified 10 related tags for a candidate item, but the confidence in the model is low, there is a likelihood that the identified related tags might have been erroneously identified. In such instances, it may be desirable to route the item for manual tagging. As a further example, in some implementations, the determination may further include a maximum number of tags in the related items set. For example, if too many tags are identified, it may be that the value of any prediction is likely to be inaccurate or prove to be resource intensive to process. Equation 2 below illustrates the inclusion of this maximum.

$$(\text{rel\_tags} > \text{min\_tag\_count}) \&\&$$
$$(\text{rel\_tags} < \text{max\_tag\_count}) \&\&$$
$$(\text{model\_conf} > \text{min\_model\_conf}) \quad \text{Eq.(2)}$$

where:
rel_tags is the number of tags in the related tags set,
min_tag_count is the minimum number of tags in the related tags set,
max_tag_count is the maximum number of tags in the related tags set,
model_conf is the confidence in the model used to generated the relations, and
min_model_conf is the minimum threshold confidence for the process.

If the set of related tags includes at least one tag, and the model confidence is sufficiently high, the process 450 continues from block 454 to block 408. At block 408, a relation configuration is obtained as described above with reference to FIG. 4B.

At block 456, a determination is made as to whether tags in the set of related tags exist which are related to the candidate item with a specified tag confidence level. The relation may be assessed using a minimum relatedness to the candidate item and a minimum confidence level for each tag in the set. For example, even if a tag is identified as related, there may be low confidence in the accuracy of the metadata (e.g., tag) for the identified tag in relation to the candidate item. In such instances, it may be desirable to avoid autotagging with the questionable metadata for the particular item and provide further review, such as via manual tagging or quality control.

If the determination at block 456 is negative, the process 450 proceeds to block 406 for routing to manual tagging as previously described. In some implementations, the identified tags may be routed with the candidate item and provided as suggestions for manual tagging. If the determination at block 456 is affirmative, the process 450 proceeds to block 458.

At block 458 a determination is made as to whether tags in the set of related tags exist which are closely related to the candidate item. Close relation may be determined when the relatedness for a tag in the related tags set meets or exceeds the relatedness for autotagging value and an autotagging confidence value. For example, if a tag is identified as related at a level which is suitable for autotagging, there may be low confidence in the accuracy of the metadata (e.g., tag) for the identified tag. If the determination is negative, the tags included in the set of related tags which meet or exceed the relatedness for autotagging may be nominated for application to the candidate item. These tags may be provided at block 418 for review via tag quality control. In such cases, one or more of the candidate item, the related tags, or the identifiers of the related tags may be provided to the quality control system, such as the quality control workstation 170.

Returning to block 458, if the determination is made that tags exist in the set of related tags which qualify for autotagging, at block 416, one or more of: the candidate item, the related tags, or identifiers of the related tags may be provided for automated tagging, such as to the automated tagging server 190 (FIG. 1) or the automatic tag generator 206 (FIG. 2).

Figure 5:
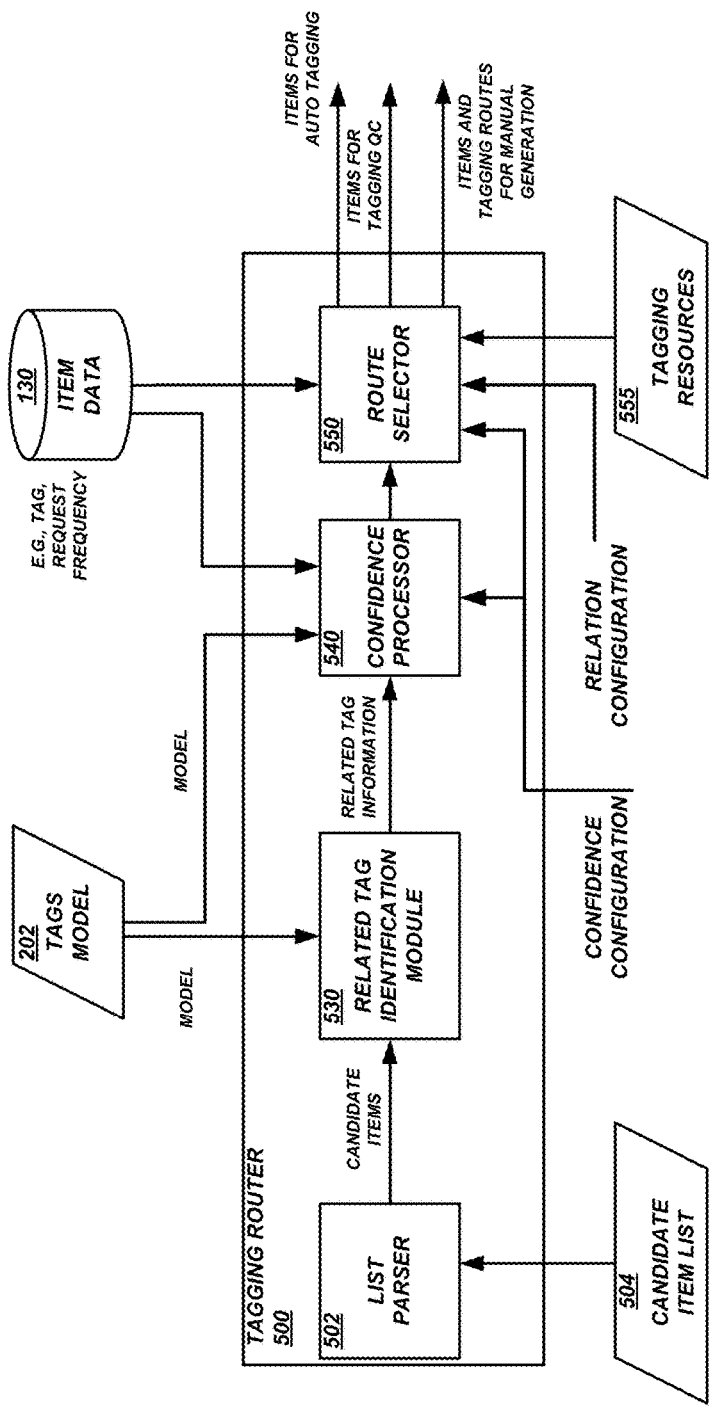
FIG. 5 is a functional block diagram of an example of a tagging router.

FIG. 5 is a functional block diagram of an example of a tagging router. The tagging router 500 is generally configured to receive candidate items to be tagged and identify one of a plurality of routes for each of the candidate items.

The tagging router 500 receives a candidate item list 504. The candidate item list 604 includes items for tagging. The tagging router 500 will determine whether the items included in the candidate item list 504 should be manually tagged or automatically tagged or have tags reviewed via a quality control procedure. The candidate item list 504 may be provided in a machine readable format such as a comma separated list, a token separated list, mark-up language document, or a spreadsheet. The candidate items may be specified in the candidate item list 504 using a unique identifier for the item such as those discussed above.

The candidate item list 504 is provided to a list parser 502 included in the tagging router 500. The list parser 502 is configured to parse items from the candidate item list 504. The parsing may be unattended, that is, without human intervention.

The candidate items, individually or collectively, may be provided to a related tag identification module 530. The related tag identification module 530 is configured to identify tags from the catalog system which may be related to a given candidate item. The identification may be made using the tags model 202. The tags model 202 may be a recurrent neural network language model trained to identify the latent features which link items and tags. For example, the candidate item identifier may be provided as an input to the tags model 202 by the related tag identification module 530. The tags model 535 then provides a set of suggested tags (or identifiers thereof) including tags which may be related to the candidate item.

The related tag identification module 530 may receive different tag models depending on the candidate item. For example, if the candidate item list includes items of different types, the related tag identification module 530 may obtain the model corresponding to the item type of the candidate item. The tags models may be stored within a storage device of the catalog system 150 or in data communication with the catalog system 150. In some implementations, the tag generator 200 may be in data communication with the storage device storing the tags models. In such implementations, the catalog system 150 may not have direct access to the storage device including the tags models.

The set of related tags may be provided to a confidence processor 540. The confidence processor 540 may be configured to generate confidence information for the tags model and related tags identified by the tags model. The confidence processor 540 may receive the confidence configuration. The confidence processor 504 may be configured to parse the confidence configuration to determine which factors to include in determining the confidence for the tags model 202 and tags identified thereby. As noted above, the determination may use item or tag metrics such as number of accesses, frequency of access, unique accesses, repeat accesses by a group (e.g., account, family, geographic location, etc.), number of items of a given item type, or other item or tagging data available via the catalog system 150. To obtain the metrics, the confidence processor 540 may be configured to access the catalog system 150 and/or the item data storage 130.

The confidence processor 504, upon obtaining the identified metric information, generates the confidence information for one or more of the related tags and the items model 202. The confidence information and related tag information are provided to a route selector 550. It will be appreciated that in some implementations, confidence may not be needed. In such implementations, the confidence processor 504 may provide a default confidence value. In some implementations, the confidence processor 504 may be omitted entirely from the tagging router 500.

Having received the related tag information and, in some implementations, confidence information from the confidence processor 540 or the related tag identification module 530, the route selector 550 identifies a route for the candidate item. The route identifies where to send the candidate item for tagging. The decision may be performed according the methods shown in FIGS. 4A and 4B.

The route selector 550 may also receive the confidence configuration information, such as that shown in Table 3 above. The route selector 550 may receive the relation configuration information, such as that shown in Table 1 above.

The route selector 550 may also receive item data 130 and tagging resource information 555. The item data 130 may include quantity of items of the candidate type, number of items tagged with one of the identified related tags, popularity of an identified tag, or the like. The tagging resource information 555 may include available taggers, tagger current work queue (e.g., items pending tagging, duration of items in queue, etc.), current workstation bandwidth, current workstation memory usage, threshold information (e.g., tagger threshold, bandwidth threshold, memory threshold), or the like.

Based on the received information, the route selector 550 is configured to identify a tagging route for candidate items as described, for example, in FIGS. 4A and 4B. The tagging route identifies which annotation resource (e.g., manual, automatic, or quality control) to process the candidate item.

A tagging route may include a tagging priority. A tagging priority indicates the relative importance with which an item (or item associated with a given tag) should be processed. For example, if the candidate item is frequently accessed, it may be desirable to prioritize the tagging of this candidate item over a less frequently accessed item. Similarly, if a tag is associated with a low degree of relatedness to the candidate item (e.g., low confidence), it may be routed with a higher priority to ensure attention is given to the candidate item sooner than other items. As another example, if the tag is associated with items that are accessed frequently, the priority of assigning this tag may be higher than the priority for other tags.

The tagging route may also include an identified tagging resource. All manual taggers and workstations may not be the same. Some taggers may have an expertise in certain item types, item origins (e.g., Indian films, Russian literature), item genres (e.g., patent attorney musicals, documentaries, modern country), or the like which may impact the speed and quality of the manual tagging. If using third party taggers, cost of the tagging may be another factor. The factors for the available taggers may be stored in a memory or obtained from a storage device. Once items have been identified for manual tagging, the items may be further processed to identify which tagger is best suited to tag the item for the desired cost. The identification may include extracting one or more factors for an item and searching for an available tagger to route the item to.

In some implementations, the workload of a given tagger may also be considered. For example, some taggers may work faster than others. As such, items may be routed based on a queue size for a given tagger such that the work is distributed evenly across taggers. In some implementations, the distribution may consider the number of items alone or in conjunction with characteristics of the items. As such, the routing may identify a route which ensures the queued work is evenly distributed.

The workstations may also have different capabilities. As such, some workstations may not be configured for video or audio playback. In such instances, it may be desirable to route movie or music items to other workstations which are suitably configured to review the underlying item.

Additional machine learning may be implemented to further refine how the tags are identified and routed. For example, a tag classifier model may be trained to identify tags using the latent feature vectors from the language model. In such training, explicit features may also be included with the latent feature vectors. In such an implementation, the feature vectors for all item identifiers (or all item identifiers of one or more item types) may be obtained to provide a vocabulary representing the catalog. This may be achieved by obtaining access histories for multiple users. The histories are represented by a sequence of item identifiers. A modeling tool such as word2vec may be included to extract feature vectors for each item and tag.

Once the vocabulary has been obtained, a classification model, such as a tagging suggestion model, may be trained. It should be noted that one non-limiting advantage of these features is that the full catalog need not be provided to train the classification model. Instead, the feature vectors, which represents a subset of the information included in the catalog, can be used for machine learning. The output of the classification model will be tag recommendations. As such, the training data may also include corresponding tags for items in the catalog. The tag information may be retrieved from the item data storage 130 using the item identifier. The classification model is then trained to learn how the weights of the feature vectors correspond to the various tags. The training process may be feedforward neural network modeling with back-propagation for updating the weights between nodes of the neural network. The training process may be iteratively adjusting parameters of an equation such as via a genetic algorithm. Other machine learning techniques may be applied to generate the classification model.

Once the classification model is generated, it may be used to suggest tags. Tags may be suggested by passing the feature vectors for untagged items through the model to receive suggested tags for the item.

Figure 6:
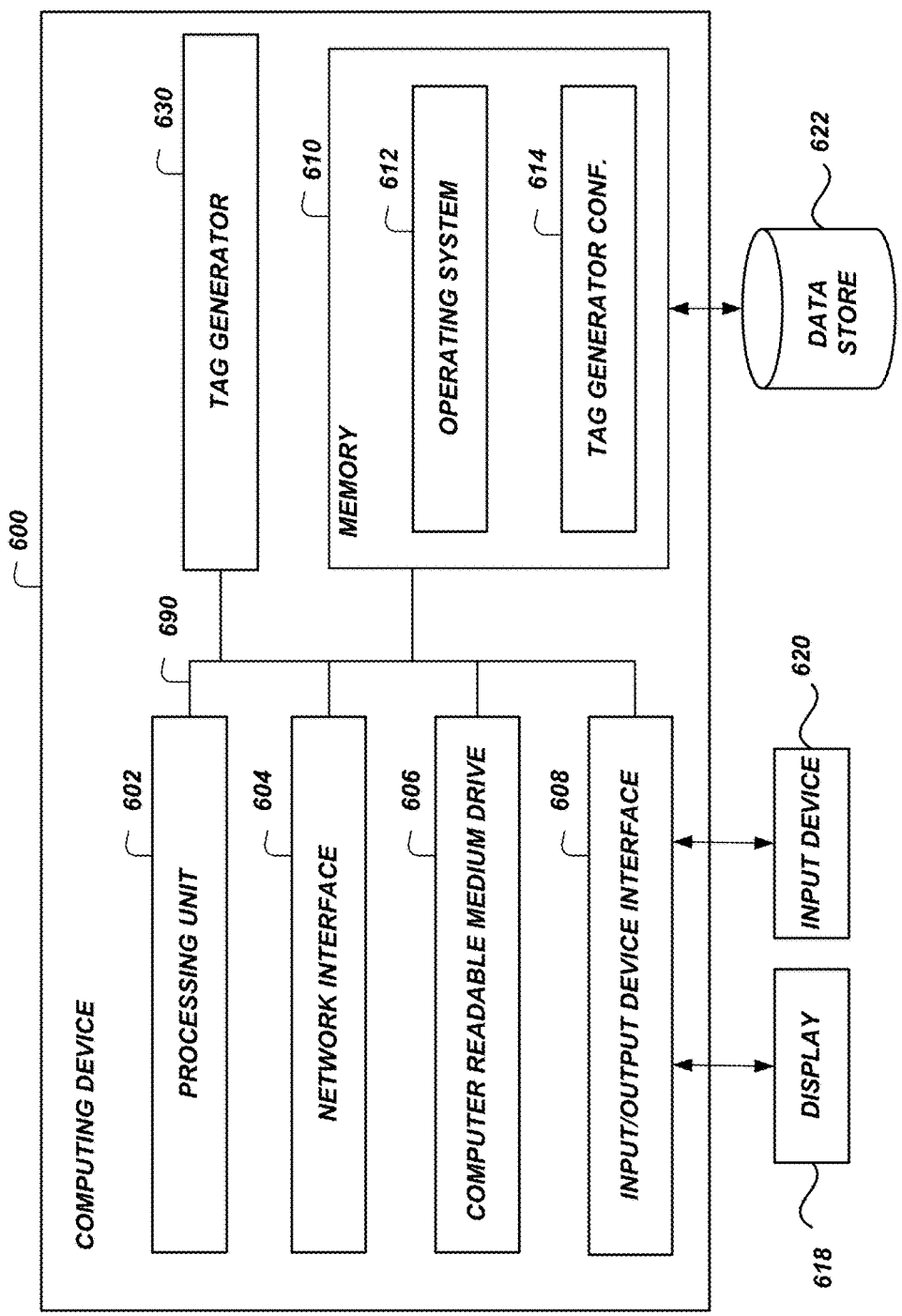
FIG. 6 is a functional block diagram of a computing device for latent feature tag routing.

FIG. 6 is a functional block diagram of a computing device for latent feature tag routing. The computing device 600 can be a server or other computing device, and can comprise a processing unit 602, a tag generator 630, a network interface 604, a computer readable medium drive 606, an input/output device interface 608, and a memory 610. The network interface 604 can provide connectivity to one or more networks or computing systems. The processing unit 604 can receive information and instructions from other computing systems or services via the network interface 604. The network interface 604 can also store data directly to memory 610. The processing unit 602 can communicate to and from memory 610 and output information to an optional display 618 via the input/output device interface 608. The input/output device interface 608 can also accept input from the optional input device 620, such as a keyboard, mouse, digital pen, microphone, mass storage device, etc.

The memory 610 contains computer program instructions that the processing unit 602 executes in order to implement one or more embodiments. The memory 610 generally includes RAM, ROM and/or other persistent, non-transitory computer readable media. The memory 610 can store an operating system 612 that provides computer program instructions for use by the processing unit 602 or other elements included in the computing device in the general administration and operation of the computing device 600. The memory 610 can further include computer program instructions and other information for implementing aspects of the present disclosure.

For example, in one embodiment, the memory 610 includes a tag generation configuration 614. The tag configuration 614 may include an item list for tag generation, an items model (or pointer thereto) for tag generation, tagging resources, thresholds, relation configuration, and/or confidence configuration as described above. The tag generation configuration 614 may store values for a given configuration. The tag generation configuration 614 may, in some implementations, store information for obtaining a given configuration. For example, the candidate item list may be specified as a network location (e.g., URL) in conjunction with username and password information to access the list. The memory 610 may also include or communicate with one or more auxiliary data stores, such as data store 622. The data store 622 may electronically store data regarding item models, item types, items, and the like.

The elements included in the computing device 600 may be coupled by a bus 690. The bus 690 may be a data bus, communication bus, or other bus mechanism to enable the various components of the computing device 600 to exchange information.

In some embodiments, the computing device 600 may include additional or fewer components than are shown in FIG. 6. For example, a computing device 600 may include more than one processing unit 602 and computer readable medium drive 606. In another example, the computing device 602 may not be coupled to a display 618 or an input device 620. In some embodiments, two or more computing devices 600 may together form a computer system for executing features of the present disclosure. In some implementations, the tag generator 630 may be implemented in part with the processing unit 602.

As one example implementation, the features described above may be included in a system. The system includes a computer-readable memory storing executable instructions. The system further includes one or more physical computer processors in communication with the computer-readable memory. The one or more physical computer processors are programmed by the executable instructions to obtain sequences of movie identifiers indicating a history of movies watched by users. The instructions also program the processors to transmit the sequences of movie identifiers to a recurrent neural network language modeling device. The instructions further program the processors to receive a recurrent neural network language model including latent feature vectors identifying, for a first movie, a degree of relatedness between the first movie and one or more tags. The instructions further program the processors to obtain a training data set, the training data set including tagged movies. A tagged movie includes a movie identifier and a tag. The instructions further cause the processors to generate a tagging suggestion model using the training data set. The inputs to the tagging suggestion model include latent features included in the latent feature vectors for a tagged movie. In this implementation, the tagging suggestion model outputs one or more suggested tag. The instructions further cause the processors to obtain a suggested tag and a confidence score for an untagged movie using the tagging suggestion model. Instructions to generate a tagging priority for the untagged movie are also provided. The tagging priority is generated using: (1) the confidence score for the suggested tag; and (2) a number of times the untagged movie is accessed or a number of times movies tagged with the suggested tag are accessed. The instructions further program the processor to selectively route the untagged movie using the suggested tag and the tagging priority for the untagged movie. The selective routing sends the suggested tag to one of: a manual tagging system for manual assignment of a tag for the untagged movie; a tagging quality control system for approval of the suggested tag for the untagged movie; or an automated tagging system for persisting the suggested tag for the untagged movie.

In some implementations of the system, the recurrent neural network language modeling includes skip-gram modeling of the plurality of sequences of movie identifiers to identify latent common features between movies and tags.

The instructions to selectively route the untagged movie may, in some implementations, include instructions to generate tagging priorities for suggested tags of other untagged movies using: (1) the confidence scores for the suggested tags of the other untagged movies; and (2) a number of times the other untagged movies are accessed or a number of time movies tagged with the suggested tag are accessed. The instructions may further program the processors to select a route for the untagged movie based on a comparison of the tagging priority of the untagged movie with the tagging priorities of the other untagged movies.

The instructions to selectively route the untagged movie may include instructions to route the untagged movie to the manual tagging system when the suggested tag indicates the tagging suggestion model could not suggest a tag for the untagged movie or when the confidence score indicates a confidence level in the suggested tag which is less than a minimum confidence level.

Instructions to route the untagged move to the tagging quality control system when the confidence score is higher than the minimum confidence level but less than a maximum confidence level may also be provided to program the processors. The processors may also access instructions to route the untagged move to the automated tagging system when the confidence score is higher than the maximum confidence level.

In some implementations of the system, selectively routing the untagged movie to the manual tagging system includes obtaining capabilities of a first tagging resource and a second tagging resource. The capabilities of the first tagging resource indicate the first tagging resource is video-enabled. Selectively routing may also include generating a manual tagging route for the untagged movie to the first tagging resource using the capabilities of the first tagging resource.

In some implementations of the system, a movie identifier includes a nonword string of alphanumeric characters that uniquely identify the movie within the system. Other features described above and shown in the accompanying figures may be included in the system.

As another example, the features described above may be implemented in a computer-implemented method. The method is performed under control of one or more computing devices configured with specific computer-executable instructions. The method includes obtaining sequences of item identifiers indicating a history of items requested by users. The method further includes generating a model, such as a recurrent neural network language model, using the sequences of item identifiers. The model is configured to provide a degree of relatedness between an input item identifier and a tag. The method also includes identifying a suggested tag for an untagged item using the model to identify a tag having a highest degree of relatedness to the untagged item as compared to other tags. The method further includes generating a tagging priority for the untagged item. The tagging priority is generated using: (1) the highest degree of relatedness; and (2) a request frequency metric for the untagged item. The method further includes selectively route the untagged item to an automated tagging system using the suggested tag and the tagging priority for the untagged item.

In some implementations of the method, generating the recurrent neural network language model may include skip-gram modeling of the sequences of item identifiers to identify latent common features between items and tags.

It may be desirable to include instructions to generate tagging priorities for suggested tags of other untagged items using request frequencies of the other untagged items. Instructions to select a route for the untagged item based on a comparison of the tagging priority of the untagged item with the tagging priorities of the other untagged items may also be included in the method.

In some implementations, the method includes obtaining confidence information for the tag. The confidence information indicates a level of review of the tag. In such implementations, selectively routing the suggested tag and the tagging priority may also use this confidence information.

The method may include, in some implementations, obtaining manual tagging resource information identifying a tagging resource. The method may further include generating a manual tagging route for the untagged item to the tagging resource using the manual tagging resource information. An item identifier included in the item of identifiers may include a nonword string of alphanumeric characters that uniquely identify the movie within the system.

As a further example implementation, a non-transitory computer readable medium storing a computer-executable module that, when executed by a processor of a computing device, that causes the computing device to perform one or more of the methods described may be provided.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processing device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processing device can be or include a microprocessor, but in the alternative, the processor device can be or include a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more physical computer processors in communication with the computer-readable memory, wherein the one or more physical computer processors are programmed by the executable instructions to at least:
   obtain a plurality of sequences of movie identifiers indicating a history of movies watched by a plurality of users;
   transmit the plurality of sequences of movie identifiers to a recurrent neural network language modeling device;
   receive a recurrent neural network language model including latent feature vectors identifying, for a first movie, a degree of relatedness between the first movie and one or more tags;
   obtain a training data set, the training data set including tagged movies wherein a tagged movie comprises a movie identifier and a tag;
   generate a tagging suggestion model using the training data set, wherein inputs to the tagging suggestion model include latent features included in the latent feature vectors for a tagged movie and wherein the tagging suggestion model outputs one or more suggested tag;
   obtain a suggested tag and a confidence score for an untagged movie using the tagging suggestion model;
   generate a tagging priority for the untagged movie using:
      the confidence score for the suggested tag; and
      a number of times the untagged movie is accessed or a number of times movies tagged with the suggested tag are accessed; and
   selectively route the untagged movie using the suggested tag and the tagging priority for the untagged movie to one of:
      a manual tagging system for manual assignment of a tag for the untagged movie;
      a tagging quality control system for approval of the suggested tag for the untagged movie; or
      an automated tagging system for persisting the suggested tag for the untagged movie.

2. The system of claim 1, wherein the recurrent neural network language modeling comprises skip-gram modeling of the plurality of sequences of movie identifiers to identify latent common features between movies and tags.

3. The system of claim 1, wherein the instructions to selectively route the untagged movie further comprise instructions to:
   generate tagging priorities for suggested tags of other untagged movies using:
      the confidence scores for the suggested tags of the other untagged movies; and
      a number of times the other untagged movies are accessed or a number of time movies tagged with the suggested tag are accessed; and
   select a route for the untagged movie based on a comparison of the tagging priority of the untagged movie with the tagging priorities of the other untagged movies.

4. The system of claim 1, wherein the instructions to selectively route the untagged movie further comprise instructions to:
   route the untagged movie to the manual tagging system when the suggested tag indicates the tagging suggestion model could not suggest a tag for the untagged movie or when the confidence score indicates a confidence level in the suggested tag which is less than a minimum confidence level;
   route the untagged move to the tagging quality control system when the confidence score is higher than the minimum confidence level but less than a maximum confidence level; and route the untagged move to the automated tagging system when the confidence score is higher than the maximum confidence level.

5. The system of claim 1, wherein selectively routing the untagged movie to the manual tagging system comprises:
obtaining capabilities of a first tagging resource and a second tagging resource, wherein the capabilities of the first tagging resource indicate the first tagging resource is video-enabled; and
generating a manual tagging route for the untagged movie to the first tagging resource using the capabilities of the first tagging resource.

6. The system of claim 1, wherein a movie identifier comprises a nonword string of alphanumeric characters that uniquely identify a movie within the system.

7. A computer-implemented method comprising:
under control of one or more computing devices configured with specific computer-executable instructions,
obtaining a plurality of sequences of item identifiers indicating a history of items requested by a plurality of users;
generating a model using the plurality of sequences of item identifiers, the model configured to provide a degree of relatedness between an input item identifier and a tag;
identifying a suggested tag for an untagged item using the model to identify a tag having a highest degree of relatedness to the untagged item as compared to other tags;
generating a tagging priority for the untagged item using:
the highest degree of relatedness; and
a request frequency metric for the untagged item; and
selectively route the untagged item to an automated tagging system using the suggested tag and the tagging priority for the untagged item.

8. The computer-implemented method of claim 7, wherein the model comprises a recurrent neural network language model.

9. The computer-implemented method of claim 8, wherein generating the recurrent neural network language model comprises skip-gram modeling of the plurality of sequences of item identifiers to identify latent common features between items and tags.

10. The computer-implemented method of claim 7, further comprising instructions to:
generate tagging priorities for suggested tags of other untagged items using request frequencies of the other untagged items; and
select a route for the untagged item based on a comparison of the tagging priority of the untagged item with the tagging priorities of the other untagged items.

11. The computer-implemented method of claim 7, further comprising instructions to:
obtain confidence information for the tag, the confidence information indicating a level of review of the tag, and
selectively route the untagged item using the confidence information.

12. The computer-implemented method of claim 7, further comprising:
obtaining manual tagging resource information identifying a tagging resource; and
generating a manual tagging route for the untagged item to the tagging resource using the manual tagging resource information.

13. The computer-implemented method of claim 7, wherein an item identifier included in the item of identifiers comprises a nonword string of alphanumeric characters that uniquely identify an item within the system.

14. A non-transitory computer readable medium storing a computer-executable module that, when executed by a processor of a computing device, cause the computing device to perform a process comprising:
obtaining a plurality of sequences of item identifiers indicating a history of items requested by a plurality of users;
generating a model using the plurality of sequences of item identifiers, the model configure to provide a degree of relatedness between an input item identifier and a second item identifier;
identifying a suggested tag for an untagged item using the model to identify a tagged item having a highest degree of relatedness to the untagged item as compared to other tagged items;
generating a tagging priority for the untagged item using:
the highest degree of relatedness; and
a request frequency metric for the untagged item; and
selectively routing the untagged item to an automated tagging system using the suggested tag and the tagging priority for the untagged item.

15. The non-transitory computer readable medium of claim 13, wherein the model comprises a recurrent neural network language model.

16. The non-transitory computer readable medium of claim 15, wherein generating the recurrent neural network language model comprises skip-gram modeling of the plurality of sequences of item identifiers to identify latent common features between items.

17. The non-transitory computer readable medium of claim 13, wherein the process performed by the computer-executable module, when executed by the processor of the computing device, further comprises:
generating tagging priorities for suggested tags of other untagged items using request frequencies of the other untagged items; and
selecting a route for the untagged movie based on a comparison of the tagging priority of the untagged item with the tagging priorities of the other untagged items.

18. The non-transitory computer readable medium of claim 13, wherein the process performed by the computer-executable module, when executed by the processor of the computing device, further comprises:
obtaining confidence information for the tagged item, the confidence information indicating a level of review of the tagged item, and
selectively routing the untagged item using the confidence information.

19. The non-transitory computer readable medium of claim 13, wherein the process performed by the computer-executable module, when executed by the processor of the computing device, further comprises:
obtaining manual tagging resource information identifying a tagging resource; and
generating a manual tagging route for the untagged item to the tagging resource based on the manual tagging resource information.

20. The non-transitory computer readable medium of claim 13, wherein an item identifier included in the item of identifiers comprises a nonword string of alphanumeric characters that uniquely identify the item.

* * * * *